United States Patent
Wang et al.

[11] Patent Number: 6,010,196
[45] Date of Patent: Jan. 4, 2000

[54] SIMULATED CHROME PLATED VEHICLE WHEEL

[76] Inventors: Calvin S. Wang, 14317 E. Don Julian Rd., Industry, Calif. 91746; Mitchell M. Nunes, 8216 Mays Ave., Riverview, Fla. 33569

[21] Appl. No.: 09/042,445

[22] Filed: Mar. 16, 1998

[51] Int. Cl.⁷ .................................................. B60B 7/10
[52] U.S. Cl. ..................................... 301/37.34; 301/37.36
[58] Field of Search ............................. 301/37.1, 37.31, 301/37.34, 37.35, 37.36, 37.42

[56] References Cited

U.S. PATENT DOCUMENTS

| | | | |
|---|---|---|---|
| 3,036,867 | 5/1962 | Zyon | 301/37.34 |
| 3,868,147 | 2/1975 | Beisch | 301/37.31 |
| 5,366,278 | 11/1994 | Brumfield | 301/37.36 X |
| 5,577,809 | 11/1996 | Chase | 301/37.43 |
| 5,639,149 | 6/1997 | Chiu | 301/37.36 X |

*Primary Examiner*—Russell D. Stormer
*Attorney, Agent, or Firm*—Albert O. Cota

[57] ABSTRACT

A simulated chrome plated vehicle wheel (10). The simulation is accomplished by placing over a conventional, non-plated vehicle wheel (12) a thin, chrome plated wheel cover (30) that is preferably constructed of a plastic substrate. The wheel cover (30) has a contour and includes surface patterns that are identical to the contour and surface patterns of the vehicle wheel (12). Thus, when the wheel cover (30) is attached, the vehicle wheel (12) has the appearance of a solid chrome plated vehicle wheel. The wheel cover (3) features a plurality of wheel cover fasteners (44) that preferably consist of a wheel clip retainer (46) and a wheel clip (76). The retainer (46) is integrally molded to a circumferential edge (36) on the wheel cover (30). The retainer (46) forms a partial wheel clip cavity (56) that is dimensioned to frictional accept and retain the wheel clip (76). The wheel clip includes an inner wheel edge clip (96) and an outer wheel edge clip (110). when the wheel cover (30) is pressed downward over the vehicle wheel (12) the two clips (96,110) clamp onto the circumferential edge (18) of the vehicle wheel (12) to securely hold the wheel cover (10) to the vehicle wheel (12).

1 Claim, 4 Drawing Sheets

SIMULATED CHROME PLATED VEHICLE WHEEL

TECHNICAL FIELD

The invention pertains to the general field of vehicle wheels and more particularly to a vehicle wheel cover that simulate the appearance of a chrome plated vehicle wheel.

BACKGROUND ART

In today's world, automobiles have become the primary means of transportation for many people. Also, in addition to providing transportation, automobiles have also become a visible symbol of what type of person someone may be. Obviously, wealthy people perceive expensive automobiles as a status symbol. A rugged, individualist will often drive a utility-type vehicle, with four-wheel drive and other off-road additions. Some people like to express themselves by painting their automobiles bold colors, or by decorating their automobiles with a variety of custom, personalized items.

As a result of people's desires to customize their automobiles, a large market has been created, which caters exclusively to after-market automobile products with the advent of new technology in metal production, one of the most popular items used to customize or up-grade an automobile is the alloy or "mag" wheel.

The difference in the appearance of an automobile which has these types of wheels, when compared to an automobile with standard wheels, or even hubcaps, is very substantial. For those people who want the ultimate in high-quality, luxurious wheels, the very expensive chrome-plated versions of alloy wheels are the most prized. Most luxury cars come wither with chrome-plated wheels standard, or as an available option. Unfortunately, for people who can not afford a luxury car, the only way to have chrome-plated wheels is to purchase them from a company who sells them. Regardless of how a person acquires chrome-plated wheels, they can often be very expensive. Also, unless a person installs special lug nuts with a locking mechanism, chrome-plated wheels are frequently stolen. This risk factor, along with the lost, are often enough of a detriment to cause many people to choose not to purchase chrome-plated wheels.

The present invention provides a chrome-plated wheel, or a wheel that appears to be chrome-plated, that is not as expensive and that does not present a significant investment.

A search of automotive catalogs and other automotive industry publications did not disclose any relative prior art.

DISCLOSURE OF THE INVENTION

The chrome plated vehicle wheel cover is designed to be placed over a standard, non-plated factory wheel. Once placed, the factory wheel has the appearance of a costly chrome plated wheel. Each chrome plated cover is specifically designed to match the contour and stylistic surface pattern of the particularly factory wheel which is to be covered by the inventive wheel cover.

The inventive wheel cover is designed to be placed over a vehicle wheel having an outer surface with an upward extending circumferential edge. The wheel cover has an outer surface which conforms to the outer surface of the vehicle wheel, a circumferential edge and a circumferential flat ledge that extends from the circumferential edge. Adjacent the circumferential edge is located a plurality of wheel cover fasteners. When the wheel cover is positioned over the vehicle wheel and pressed downward, the wheel cover fasteners allow the wheel cover to be securely fastened to the upward extending circumferential edge on the vehicle wheel.

In view of the above disclosure, it is the primary object of the invention to produce a set of chrome plated wheel covers that when attached to a standard vehicle wheel, the wheel appears to be chrome plated.

In addition to the primary object of the invention it is also an object of the invention to produce a simulated chrome plated wheel cover that:

can be made to accommodate various designs of standard vehicle wheels, features a combination wheel clip retainer and wheel clip that firmly attaches the cover to the vehicle wheel, when attached, the perceived value of the vehicle increases, is cost effective from both manufacturers and consumer points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment for a simulated chrome plated vehicle wheel 10. The preferred embodiment, as shown in FIGS. 1–10, is comprised of a conventional vehicle wheel 12, a chrome plated wheel cover 30 and a plurality of wheel cover fasteners 44.

Figure 2:
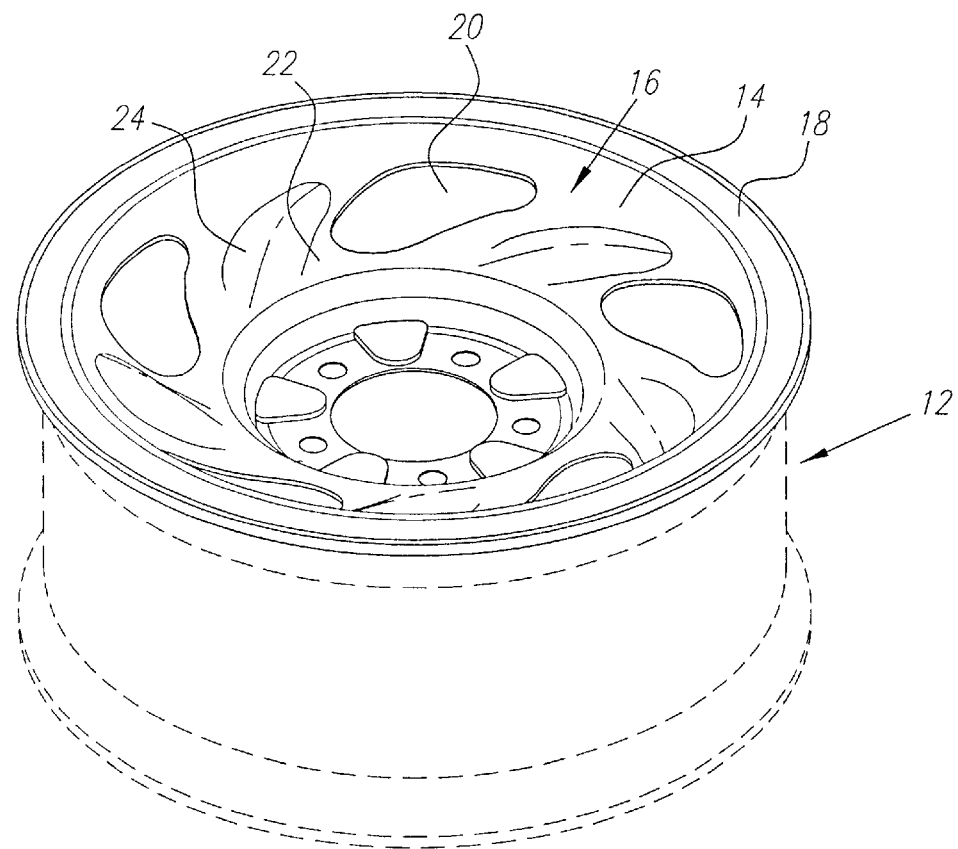
FIG. 2 is a perspective view of a vehicle wheel prior to having the plated wheel cover attached.

The vehicle wheel 12 as shown in FIG. 2, is typically constructed of steel and includes an outer surface 14 which has a stylistic pattern 16 and an upward extending circumferential edge 18. The stylistic pattern of the wheel is typically comprised of a design which includes a combination of open areas 20, indentations 22 and/or protrusions 24 as shown in FIG. 2. The diameter of the wheel can range between 12-inches (30.5 cm) to 24 inches (61 cm).

Figure 1:
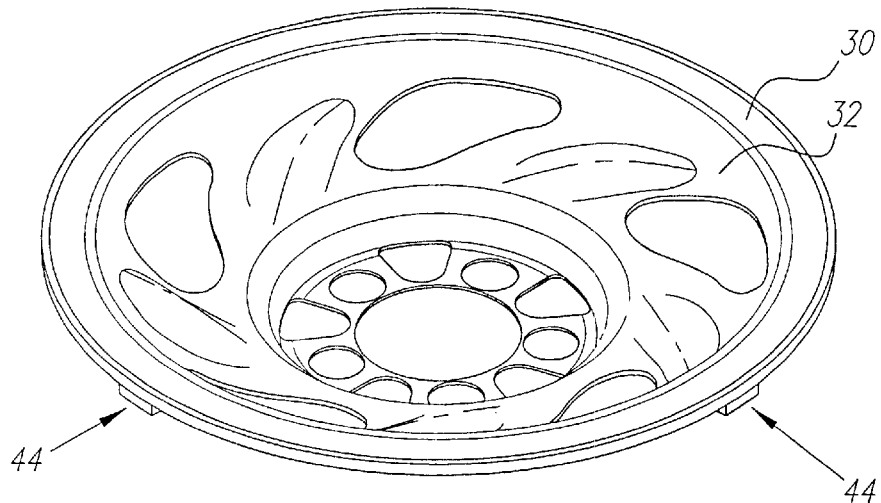
FIG. 1 is a perspective view of the chrome plated wheel cover prior to being attached to a vehicle wheel.
Figure 3:
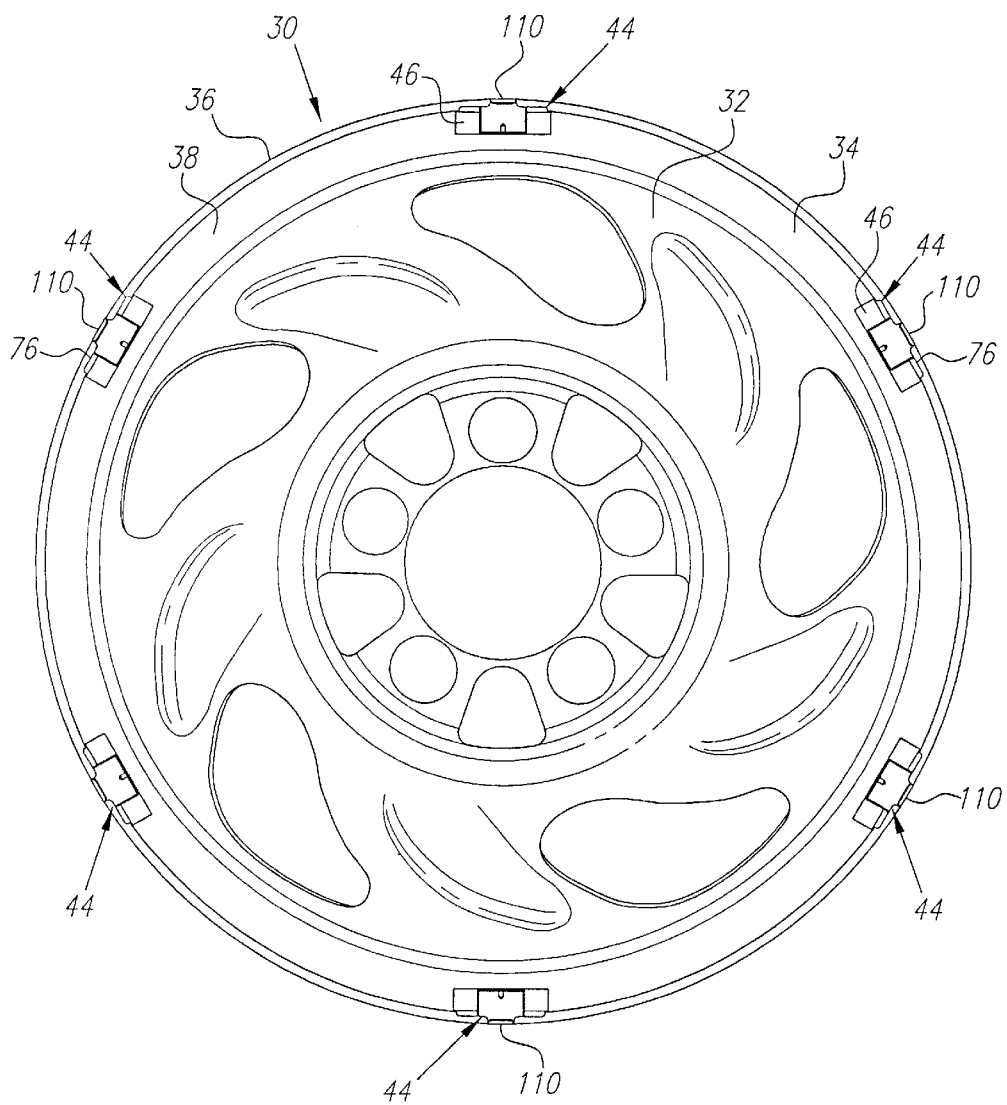
FIG. 3 is a rear plan view of the wheel cover showing the location of seven wheel cover fasteners.

The chrome plated wheel cover 30, as shown with an upper surface in FIG. 1 and with its lower surface in FIG. 3, is molded of a plastic material such as PVC. The cover has an outer surface 32 which conforms to the outer surface 14 and the stylistic pattern 16 of the specific vehicle wheel 12 that is to be converted to a simulated chrome plated vehicle wheel 10. The wheel cover 30, as shown in FIG. 3, has on its rear side 34 a circumferential edge 36 and a circumferential flat edge 38 that extends inward from the circumferential edge 36. Around and adjacent to the circumferential edge 36 on the circumferential flat edge 38 is located a plurality of wheel cover fasteners 44.

To attach the wheel cover 30 to the vehicle wheel 12 it is positioned over the vehicle wheel 12 as shown in FIGS. 1 and 3. Once positioned, the wheel cover 30 is pressed downward to allow the wheel cover fasteners 44 to make contact with and be securely fastened to the upward extending circumferential edge 18 on the vehicle wheel 12. When the wheel cover 30 is attached, the vehicle wheel simulates the appearance of a solid chrome plated vehicle wheel 10.

The wheel cover fasteners 44 can range from 3 to 10 fasteners per wheel cover 30, with seven fasteners preferred as shown in FIG. 3. Each fastener 44 consists of a wheel clip retainer 46 and a wheel clip 76.

Figure 4:
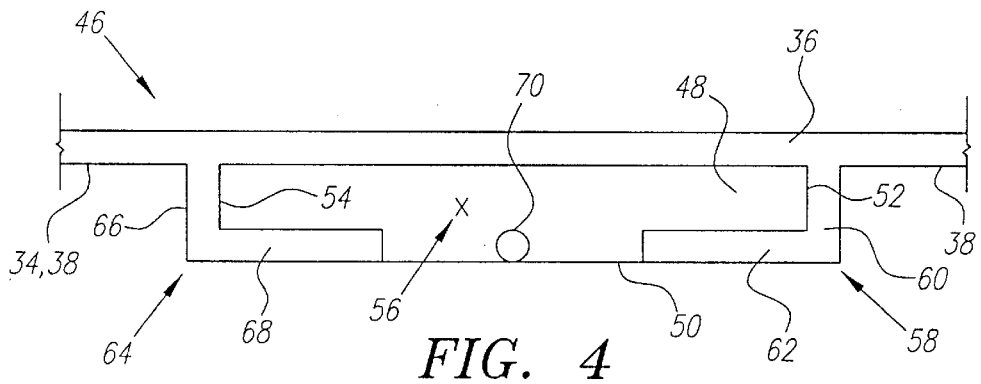
FIG. 4 is an elevational front view of a wheel clip retainer showing the partial wheel clip cavity created by the rear vertical section, the first L-structure and the second L-structure.
Figure 5:
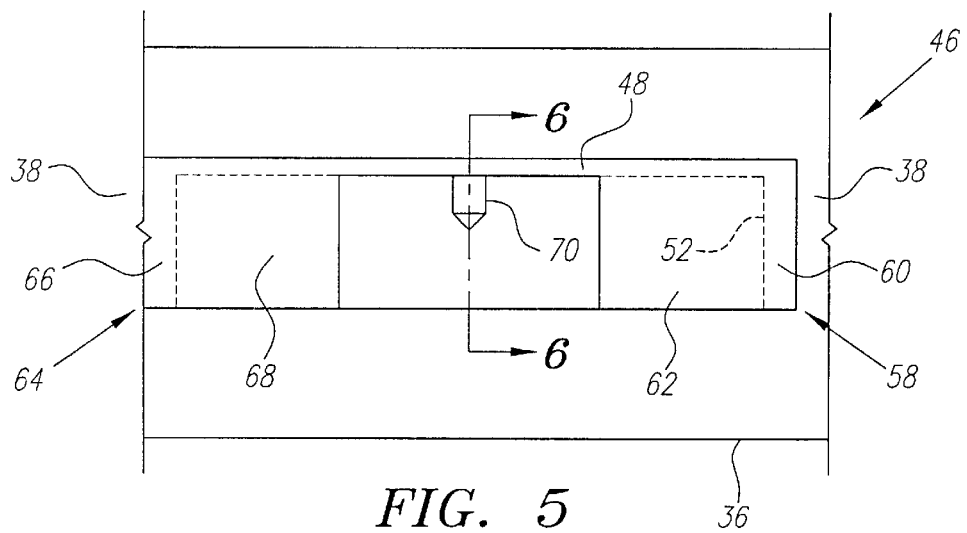
FIG. 5 is a plan view of a wheel clip retainer.
Figure 6:
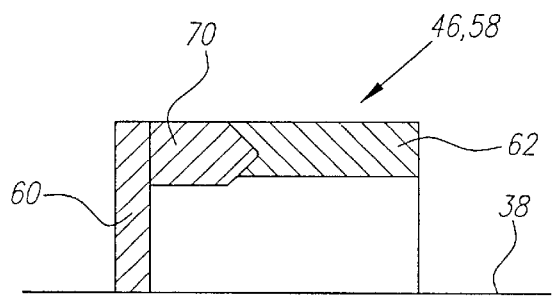
FIG. 6 is a side sectional view of the wheel clip retainer taken along the lines 6—6 of FIG. 5.
Figure 7:
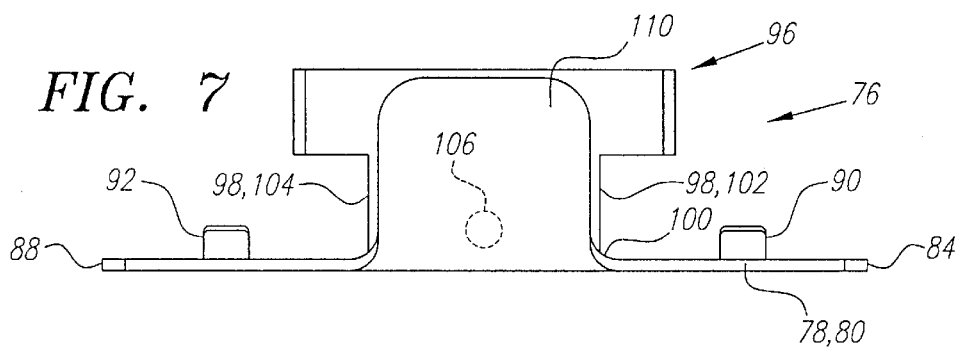
FIG. 7 is a front elevational view of the wheel clip.
Figure 8:
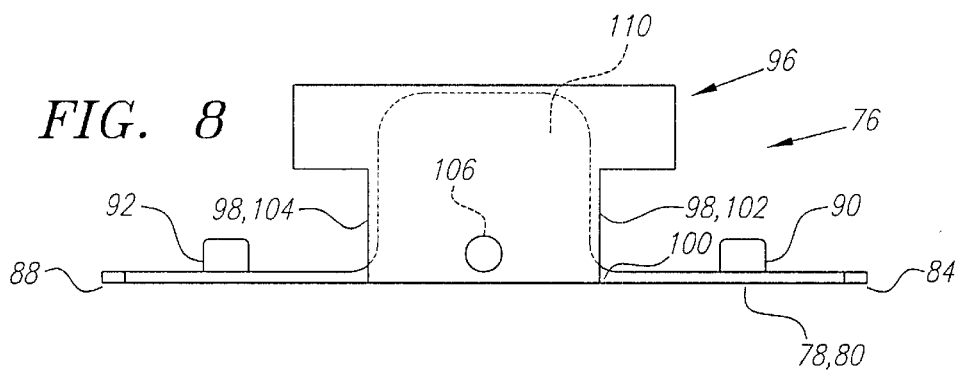
FIG. 8 is a rear elevational view of the wheel clip.

The wheel clip retainer 46, as shown in FIGS. 4, 5 and 6 is preferably an integrally molded element of the wheel cover 30 and forms a partial wheel clip cavity 56 which is dimensioned to receive the wheel clip 76 as described infra. The retainer 44 consists of a rear vertical section 48, a first L-structure 58, a second L-structure 64 and a retaining pin 70.

The rear vertical section 48, as best shown in FIG. 4, extends downward from the circumferential flat ledge 38 on the wheel cover 30. The rear vertical section 48 includes a lower edge 50, a first side edge 52 and a second side edge 54.

The first L-structure 58 as shown in FIGS. 4, 5 and 6, includes a vertical section 60 and a horizontal section 62. The vertical section 60, as best shown in FIG. 4, extends downward from the circumferential flat ledge 38, is located adjacent the first side edge 52 of the rear vertical section 48 and terminates near the circumferential edge 36 as shown best in FIG. 5. The horizontal section 62 has a similar width as the vertical section 60. The section 62 extends inward from the vertical section 60 and across the lower edge 50 of the rear vertical section 48 for a distance near one-third the distance of the rear vertical section 48 as shown in FIGS. 4 and 5.

The second L-structure 64, which is also shown in FIGS. 4, 5 and 6, includes a vertical section 66 that extends downward from the circumferential flat ledge 38, is adjacent the second side edge 54 of the rear vertical section 48 and terminates near the circumferential edge 36 as shown best in FIG. 5. The horizontal section 68 has a similar width as the vertical section 66 and extends inward from the vertical section 66 and across the lower edge 50 of the rear vertical section 48 for a distance near one-third the distance of the rear vertical section 48 as shown in FIGS. 4 and 5.

The retaining pin 70, as shown best in FIGS. 4 and 5, extends outward from the center of the rear vertical section 48 and terminates near the center of the first and second L-structures 58,60 as shown in FIG. 5.

The second element of the wheel cover fastener 44 is the wheel clip 76. The wheel clip 76, as shown in FIGS. 7–10, is made of a stamped metal such as plated steel and is dimensioned to fit into the partial wheel clip cavity 56 and be attached thereto. The clip 76 consists of a horizontal section 78, an inner wheel edge clip 96 and an outer wheel edge clip 110.

Figure 9:
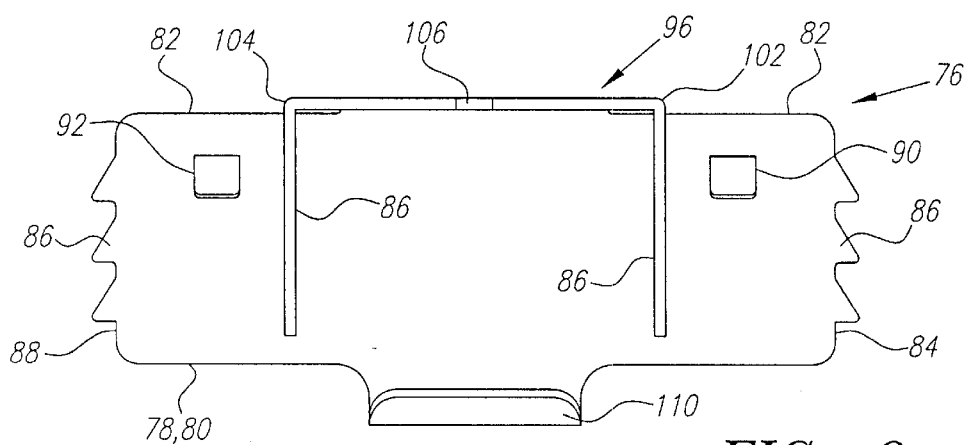
FIG. 9 is a top plan view of the wheel clip.
Figure 10:
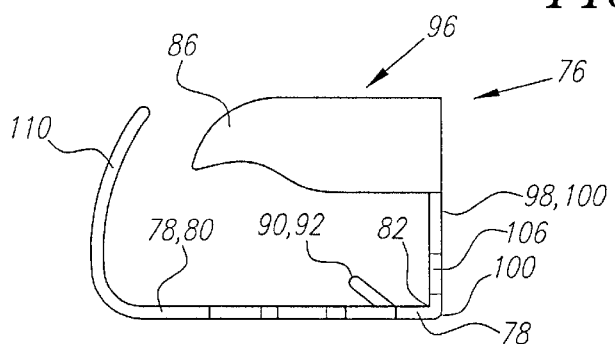
FIG. 10 is a side elevational view of the wheel clip.

The horizontal section 78 has a front edge 80, a rear edge 82, a first side 84 and a second side 88. As shown in FIG. 9, the first side 84 includes a plurality of forward-facing barbs 86 and the second side 88 also includes a plurality of outward-facing barbs 86. Near the rear edge 82 and near the first side 84 is an upward and outward facing first tab 90 and an upward and outward facing second tab 92 is located near the rear edge 82 and near the second side 88. The combination of the forward facing barbs 86 and the upward extending first and second tabs 90,92 securely lock the wheel clip 76 to the partial clip cavity 56 located on the wheel clip retainer 46.

The inner wheel edge clip 96 has a vertical section 98 that extends upward from the center of the rear edge 82 of the horizontal section 78. The vertical section 98 has a lower edge 100, a first side 102, a second side 104 and a bore 106 that is aligned and dimensioned to receive the retaining pin 70 on the wheel clip retainer 46. From the first side 102 of the vertical section 98 extends outward a forward-facing barb 86, and from the second side 104 of the vertical section 98 also extends outward a forward-facing barb 86.

The outer wheel edge clip 110 curves upward and inward from the center front edge 80 of the horizontal section 78. When the wheel cover 30 is pressed into the circumferential edge 18 of the vehicle wheel 12, the combination of the outward facing barbs 86 on the inner wheel edge clip 96 and the outer wheel edge clip 110 lock onto the circumferential edge 18 of the vehicle wheel 12 causing the wheel cover 30 to become securely locked to the vehicle wheel 12.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

We claim:

1. A simulated chrome plated vehicle wheel comprising:
   a) a vehicle wheel having an upward extending circumferential edge and an outer surface with a stylistic pattern consisting of a combination of open areas, indentations and protrusions and
   b) a chrome-plated plastic wheel cover having an outer surface with a stylistic pattern which conforms to the stylistic pattern on said vehicle wheel, a circumferential edge, a circumferential flat ledge that extends from the circumferential edge, and a plurality at least six wheel cover fasteners positioned around and adjacent the circumferential edge, wherein each said wheel cover fastener comprises:
      (a) a wheel clip retainer integrally molded with said wheel cover and located around and near the circumferential edge on said wheel cover, said wheel clip retainer comprising:
         (1) a rear vertical section that extends downward from the circumferential flat ledge and that includes a lower edge, a first side edge and a second side edge,
         (2) a first L-structure having a first vertical section extending downward from the circumferential flat ledge, and adjacent the first side edge of said rear vertical section and which terminates near the circumferential edge, and a horizontal section having a similar width as the vertical section and that extends inward from the vertical section and across the lower edge of said rear vertical section for a distance near one-third the distance of said rear vertical section,
         (3) a second L-structure having a vertical section extending downward from the circumferential ledge and adjacent the first side edge of said rear vertical section and which terminates near the circumferential edge, and a horizontal section having a similar width as the vertical section and that extends inward from the vertical section and across the lower edge of said rear vertical section for a distance near one-third the distance of the rear vertical section, (4) a retaining pin that extends outward from the center of said rear vertical section and terminates near the center of the first and second L-structures, wherein said clip retainer forms a partial wheel clip cavity, and (b) a plated steel metal wheel clip inserted into and retained within said clip retainer, said wheel clip comprising:

(1) a horizontal section having a front edge, a rear edge, a first side that includes a plurality of outward-facing barbs, a second side that includes a plurality of outward-facing barbs, an upward and outward facing first tab located near the first side, and an upward and outward facing second tab located near the second side, wherein the combination of the outward-facing barbs and the upward extending first and second tabs securely lock said wheel clip to the partial clip cavity located on said wheel clip retainer, (2) an inner wheel edge clip having a vertical section that extends upward from the center of the rear edge of said horizontal section, wherein said vertical section having a lower edge, a first side, a second side, and a bore that is aligned and dimensioned to receive the retaining pin on said wheel clip retainer, wherein from the first side of the vertical section extends outward a forward-facing barb, and from the second side of the vertical section also extends outward a forward-facing barb, and (3) an outer wheel edge clip that curves upward and inward from the center front edge of said horizontal section, wherein when said wheel cover is positioned over said vehicle wheel and pressed into the circumferential edge of said vehicle wheel the combination of the outward facing barbs on the inner wheel edge clip and the outer wheel edge clip lock onto the circumferential edge of said vehicle wheel causing said wheel cover to become securely fastened to said vehicle wheel, wherein when said wheel cover is attached, said vehicle wheel simulates the appearance of a solid chrome plated vehicle wheel.

* * * * *